Dec. 8, 1970 F. KOSSAR 3,545,079

METHOD OF MAKING MULTILAYER CIRCUIT SYSTEM

Filed May 2, 1968 3 Sheets-Sheet 1

INVENTOR
FREDDIE KOSSAR
BY Arnold Grant
ATTORNEY

INVENTOR
FREDDIE KOSSAR

BY Arnold Grant

ATTORNEY

INVENTOR
FREDDIE KOSSAR
BY Arnold Grant
ATTORNEY 3,545,079
METHOD OF MAKING MULTILAYER CIRCUIT SYSTEM Freddie Kossar, Norwalk, Conn., assignor to Vitramon Incorporated, Monroe, Conn., a corporation of Delaware Filed May 2, 1968, Ser. No. 726,160
Int. Cl. H05k 3/30
U.S. Cl. 29—626 9 Claims

ABSTRACT OF THE DISCLOSURE

The present invention relates to a method and apparatus for mechanically and electrically interconnecting electronic components into a circuit without the need for circuit boards and land-type connections. More particularly, the present invention discloses a three-dimensional, component-receiving and interconnecting motherboard and an arrangement for integrating discrete electrical components and the motherboard into a monolithic circuit system.

There are two general types of electronic circuits, active and passive; basically, a network is active if there is some combination of input voltages (current) and frequency for which the total power input is negative; alternatively, a network is considered to be passive if the total power input is non-negative for all frequencies and for all combinations of input voltages and/or currents. Until very recently the technological developments occuring on active components or combinations of components were paralleled by similar developments in passive components and networks. That is, the advances made from the vacuum tube to the early transistors was roughly equaled by the transition from the paper capacitor to the early porcelain and ceramic dielectric capacitors. Similarly, the miniaturization of active components was followed by corresponding reductions in the dimensions of passive components. However, beginning with the introduction of integrated circuits and the subsequent utilization of photographic techniques in the manufacture of integrated circuitry, the advances made on the active side of the spectrum have far outdistanced those made in the passive field. While several improvements are being made in micro-miniaturization of passive components and limited successes have been achieved in the combining of resistive and capacitive functions into a single component, the state of the art is still centered about discrete, individual components. Whereas, larger and larger numbers of active elements are being combined into smaller and smaller integrated circuits, the passive components must still be considered as individual elements.

The direct and most obvious product of this development lag occurs when passive components or combinations of passive and active components are wired together on a circuit board. In more instances than not, a relatively insignificant area of the board is actually occupied by the components themselves; the remainder of the board being devoted to the ever increasing number of terminations and electrical interconnections. By way of example, it is very common to find a 0.1 square inch circuit member mounted on a 4 square inch board with 50 or more terminations. As things presently stand, further advances in the art, either through continued miniaturization or the combining of circuit elements, are being frustrated, when passive elements are involved, by the necessity to attach the components to a circuit board and electrically interconnect the multitude of terminations.

The present invention addresses itself to this problem with a unique method for combining passive components or combinations of passive and active components into an electrical circuit which completely eliminates the need for circuit boards and land-type connections for the component terminations. The essence of the invention is a three-dimensional, component - receiving - interconnecting member, hereinafter referred to as a "motherboard," and an arrangement for integrating discrete electrical components and the motherboard into a monolithic circuit system. Basically, a motherboard is composed of a block of insulating material interspersed with embedded layers of conductive material. The conductive material is positioned throughout the motherboard at spaced levels and intervals; extending to the surface of the motherboard at predetermined points to provide a source of electrical connection to the system and to trace a series of conductive paths through the system. Individual components are attached to the motherboard at the sources of electrical connection and then fused to the motherboard to combine the motherboard and the components into a monolithic block. In this manner, application of components to a predetermined series of connection points on the motherboard joins the components into a preselected arrangement for performing a desired function or set of functions. It should be understood at this point that each motherboard system is designed with a specific function or set of functions in mind, in much the same manner as is a standard circuit board. The major differences being that the motherboard system is an integral monolithic block rather than individual soldered components and is in three dimensions instead of just two. Thus, once the purpose of the system and the circuit necessary to accomplish that purpose is determined, the design of an individual motherboard is centered about spatially orienting the individual components relative to each other in the motherboard and arranging the conductive layers and connections between the conductive layers to join the components into a completed circuit in the desired manner.

It is therefore an object of the present invention to provide a monolithic circuit member for mechanically and electrically interconnecting a plurality of electronic components comprising a motherboard having at least one conductive layer with at least a major portion thereof embedded in the motherboard, at least two spaced conductive points on the surface of the motherboard, the conductive points being in electrical communication with the conductive layers, the conductive points and conductive layers defining at least one conductive path within the motherboard wherein each of the components is in electrical communication with at least one conductive point so as to be joined through at least one of the conductive paths into a circuit and is fused to an integral unit with the motherboard to form a monolithic circuit member.

The present invention further proposes that the motherboard be formed by the method described in U.S. Pat. No. 2,779,975 to Lee and Weller. That is, once the spatial configuration of the components in the circuit has been determined, the motherboard will be "built-up" by depositing alternating layers of an appropriate insulating material, such as a ceramic, and a conductive and/or semi-conductive material. The area, shape and thickness of each conductive or semi-conductive layer is dependent upon its relative position in the build-up, what components it will adjoin, where these components fit into the predesigned circuit and how these components are connected to each other. After the build-up procedure is completed, the components are connected or inserted into the motherboard, in a manner to be described in greater detail hereinafter, and the entire system fired as a unit. The firing fuses or sinters each of the components and the "green" layers of the motherboard into a unitary monolithic body. What results is a monolithic block containing a multitude of circuit elements, each of which is interconnected in a predetermined arrangement to perform a designed function without the multitude of terminations for each element, without land-type connections for each element and without a circuit board.

It is therefore another object of the present invention to provide a method for forming a monolithic circuit block comprising depositing alternating layers of an insulating material and a conductive material in a predetermined pattern to form a multilayered body having at least one internal conductive path and a plurality of component contact points on the surface of the body, each of which is in electrical communication with at least one conductive path, placing preselected electronic components adjacent to preselected components contact points to electrically interconnect the components into a desired circuit, and firing the multilayered body and components to fuse the components and layers of the multilayered body into a monolithic circuit block.

The subject matter which applicant regards as his invention is particularly pointed out and distinctly claimed in the concluding portion of this specification. The invention, however, as to its organization and method of operation together with further objects and advantages thereof will best be understood by reference to the following description taken in conjunction with the accompanying drawings, in which:

Figure 4:
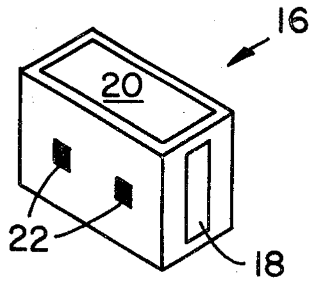
FIG. 4 is a perspective view of a component suitable for use in the motherboard system of the present invention.

Referring now to the drawings, the present invention will be described in detail. A motherboard, shown generally at 10, is composed of an appropriate insulating material, which may, for example, be a barium titanate based ceramic, interspersed with a series of spaced conductive and/or semi-conductive material layers 12. Each conductive or semi-conductive layer 12, hereinafter referred to as conductive layers, extends to and is exposed at the surface of the motherboard by a termination blob 14. The exact point or points of erruption of each conductive layer 12 on the surface of the motherboard and its configuration and area within the motherboard are dependent upon the design and purpose of the circuit defined by the motherboard system. Preferably, the motherboard is prepared according to the "build-up" method disclosed in U.S. Letters Patent No. 2,779,975 to Lee and Weller. That is, once a function or set of functions and the components and circuit necessary to perform the function have been decided upon, the design of the motherboard system concerns itself with the optimum spatial relationship between the components and the interconnections between the components. Ideally, the components will be the multielement type shown in FIG. 4, although any other active or passive component is equally as suitable for this system. The exemplary component 16 in FIG. 4 is a capacitor having an end termination 18, a cermet resistor 20 plated onto one surface and a pair of active elements 22 plated onto another surface. This particular type of component is preferable because not only does it reduce the number of components in the system, it enables many components to be electrically interconnected by physically abutting against each other. For example, the capacitor end termination 18 could abut against a similar termination on another capacitor or on a resistive plating similar to that shown at 20 to electrically interconnect the components.

Figure 1:
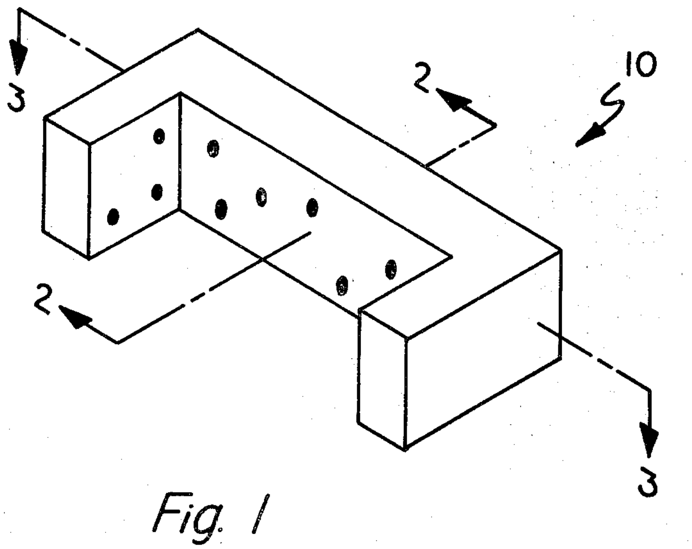
FIG. 1 is a perspective view of a simple motherboard used in the system of the present invention.
Figure 2:
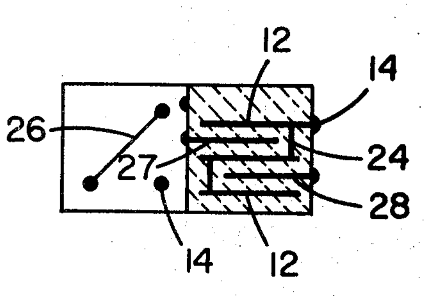
FIG. 2 is an end view in section taken along the line 2—2 of FIG. 1.

Once the circuits and components to perform the function have been synthesized, the optimum spatial configuration of the components and the interconnecting conducting paths must be determined. Each conductive layer 12 has at least one conductive path 13 deposited thereon; with the termination blobs 14 providing the electrical interconnections for the components, or "entrances" to the conductive paths 13. In a manner known in the art, individual conductive paths at one level may be joined with conductive paths at another level, either through internal risers 24 or by external connections 26 (FIG. 2), to extend the distance traveled by a particular path and thereby interconnect components or component terminals at different levels on the motherboard. The build-up process is then begun by depositing alternating layers on the ceramic and the conductive material onto a base plate (not shown). The area, configuration, number of paths and points of erruption of each conductive material layer, are dependent upon its relative position in the motherboard, the components it will contact, where those components fit into the desired circuit and how the components are connected to each other.

Figure 3:
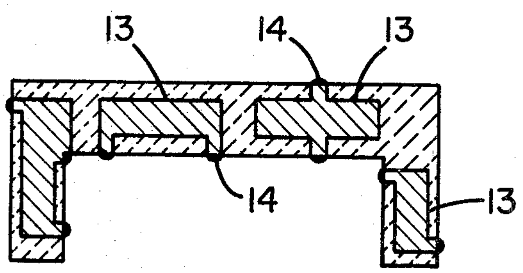
FIG. 3 is a top view in section taken along the line 3—3 of FIG. 1.
Figure 5:
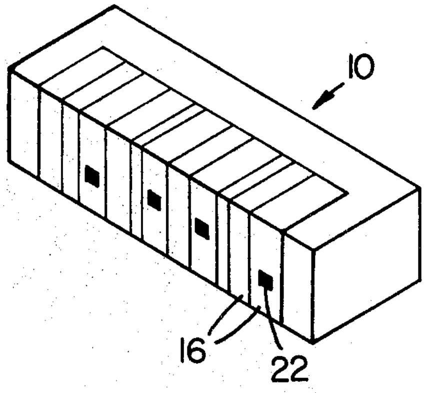
FIG. 5 is a persepective view of the motherboard and a series of components fused into a monolithic circuit block.
Figure 8:
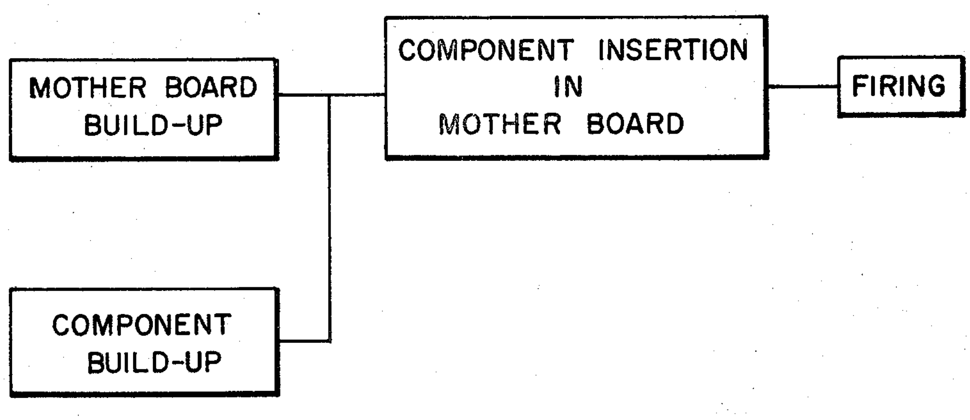
FIG. 8 is a flow diagram depicting in block form the steps of the method of the present invention.

Care must be taken in the spatial configuration of the conductive layers to minimize the parastic effects generated by the proximity of the conductive layers 12. Alternatively, the parasitic effect can be utilized to increase the efficiency of the system by inclusion, for example, of additional conductive layers 27 (FIG. 2) forming a capacitor within the motherboard, or a cermet layer 28 to include an additional resistive function without increasing the size of the motherboard. As diagrammatically depicted in FIG. 8, after the build-up of the motherboard is complete, the components, also preferably in the "green" state, are positioned on the motherboard with the appropriate terminals or elements on the components adjacent their preselected termination blobs 14 or adjacent a terminal or corresponding element of another component, as described above. The combination of components and motherboard is then fired to fuse the layers of the motherboard and components together and to fuse the components and motherboard into a monolithic block. The resulting product, illustratively shown in FIG. 5 is a solid block comprised of a multitude of circuit elements 16, each joined, in a predesigned manner, into a circuit to perform a desired function or set of functions. It will be noted from FIGS. 2 and 3 that several conductive layers 12 have their termination blobs 14 on the rear surface of the motherblock. These termination blobs can be used to connect particular components in the motherblock system, or the entire system, to external circuitry or the another motherboard.

Figure 6:
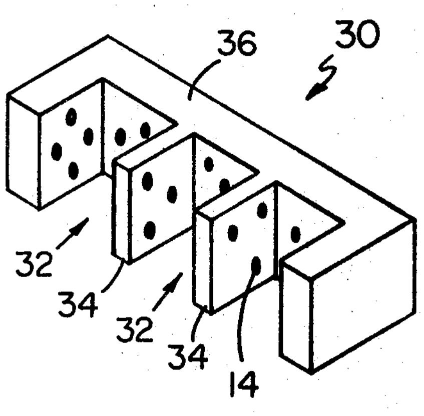
FIG. 6 is a perspective view of a complex motherboard suitable for use in the system of the present invention.

Referring now to FIG. 6 another type of motherboard, suitable for use in the system of the present invention, is shown. This particular motherboard 30 has a series of pockets 32 and a pair of element connectors 34 which provide additional, laterally extending, conductive paths for the components. That is, the conductive paths extending through the element connectors 34 are in addition to the conductive paths in the main body portion 36 of the motherboard 30. In this manner, the number of interconnections between components in the system and the number of interconnection arrangements in the system is increased without increasing the external dimensions of the motherboard.

Figure 7:
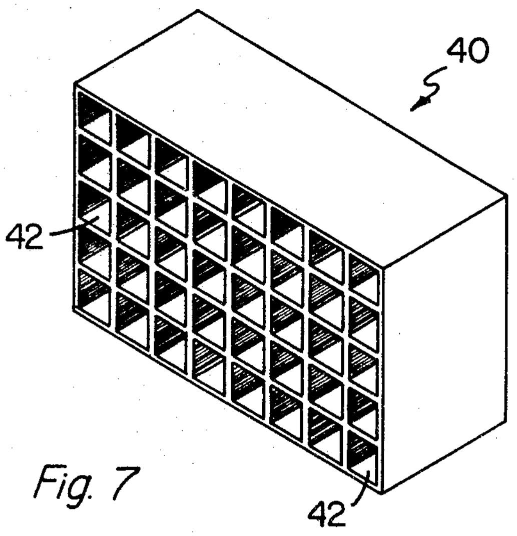
FIG. 7 is a perspective view of still another design for a motherboard suitable for use in the system of the present invention.

Looking now to FIG. 7, still another type of motherboard suitable for use in the system of the present invention, is shown. This motherboard 40 has both columns and rows of component-receiving pockets 42, the components being stacked and arranged in side by side order to formulate the desired circuit. It should be understood at this point that the motherboards shown in FIGS. 1–3 and 5–7 are by way of example only; the motherboard being able to take on any three-dimensional configuration.

As this invention may be embodied in several forms without departing from the spirit or essential characteristics thereof, the present embodiments are illustrative and not restrictive. The scope of the invention is defined by the appended claims rather than by the description preceding them, and all embodiments which fall within the meaning and range of equivalency of the claims are, therefore, intended to be embraced by those claims.

I claim:

1. A method for forming a monolithic circuit block comprising depositing alternating layers of a ceramic insulating material and a conductive material in a predetermined pattern to form a multilayered body having at least one internal conductive path and at least two terminal means on the surface of said multilayered body, said terminal means being in electrical communication with at least one conductive path, forming said multilayered body with at least one component receiving pocket; forming a plurality of electronic component members with at least one terminal means and at least one electrical element, said electronic component members having bodies of ceramic insulating material; placing at least one of said electronic component members within said component receiving pocket of said multilayered body so that at least one terminal means on the multilayered body and one terminal means on the electronic component member are in electrical contact; said ceramic insulating material of said multilayered body and said electronic component members being in a green condition; and, firing the multilayered body and electronic component members to fuse the electronic component members and the layers of the multilayered body into a monolithic circuit block.

2. A method for forming a monolithic circuit block as defined in claim 1 wherein each conductive layer is deposited with at least one conductive path.

3. A method for forming a monolithic circuit block as defined in claim 1 wherein each conductive path is deposited with at least one portion thereof extending to the surface of the multilayered body so as to be in electrical communication with a component termination blob.

4. A method for forming a monolithic circuit block as defined in claim 1 wherein selected conductive layers are deposited sufficiently close to adjacent conductive layers to perform a capacitive function in conjunction with the adjacent conductive material layers in a monolithic circuit block.

5. A method for forming a monolithic circuit block as defined in claim 1 wherein selected conductive layers are comprised of a cermet material to perform a resistive function in the monolithic circuit block.

6. The method of claim 1 further comprises forming the multilayered body with a plurality of spaced component receiving pockets each receiving at least one of said component members, each pocket having at least one terminal means to connect the component members therein to a conductive path in the multilayered body.

7. The method of claim 1 further comprises forming the multilayered body with at least one row and at least one column of spaced component member-receiving pockets, each row and each column containing at least two pockets, each pocket receiving at least one of said component members and having at least one terminal means.

8. The method of claim 1 further comprises forming the multilayered body with a plurality of alternating layers of conductive material with each conductive material layer having at least one conductive path.

9. The method of claim 8 further comprises forming the conductive paths on one conductive material layer in electrical communication with a conductive path on another conductive material layer.

References Cited

UNITED STATES PATENTS

| | | | |
|---|---|---|---|
| 2,902,628 | 9/1959 | Leno | 317—101CP |
| 2,913,632 | 11/1959 | Stanton | 317—101CM |
| 3,189,978 | 6/1965 | Stetson | 174—6.85X |

DARRELL L. CLAY, Primary Examiner

U.S. Cl. X.R.

174—68.5; 317—101